Oct. 18, 1960 G. D. LEGGE 2,957,073
COMBINATION DOME AND READING LAMP ASSEMBLY
Filed Oct. 6, 1958 2 Sheets-Sheet 1

INVENTOR.
George D. Legge
BY
*[signature]*
ATTORNEY

Oct. 18, 1960  G. D. LEGGE  2,957,073
COMBINATION DOME AND READING LAMP ASSEMBLY
Filed Oct. 6, 1958  2 Sheets-Sheet 2
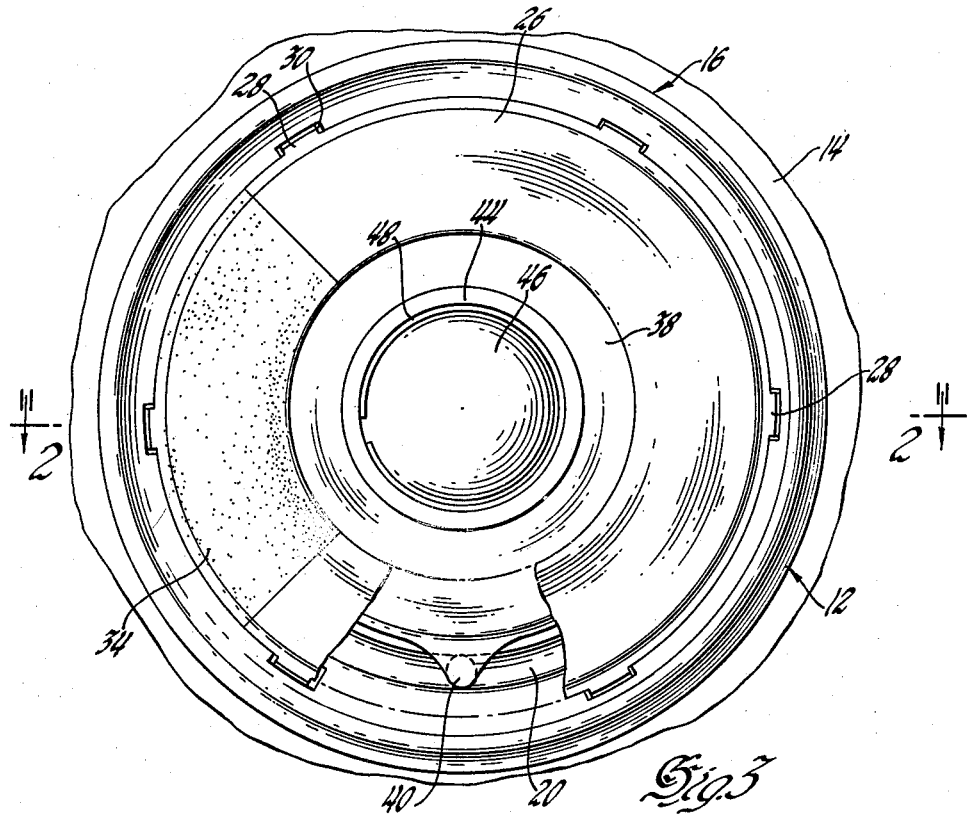
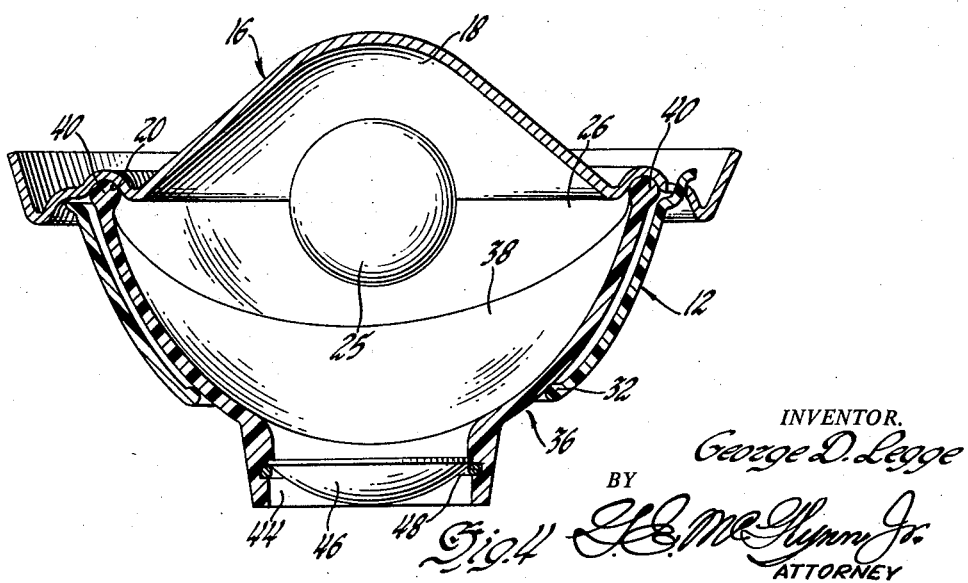
INVENTOR.
George D. Legge
BY
J. E. McGlynn Jr.
ATTORNEY

United States Patent Office 2,957,073
Patented Oct. 18, 1960

2,957,073
COMBINATION DOME AND READING LAMP ASSEMBLY

George D. Legge, Farmington, Mich., assignor to General Motors Corporation, Detroit, Mich., a corporation of Delaware Filed Oct. 6, 1958, Ser. No. 765,643

11 Claims. (Cl. 240—7.35)

This invention relates to a dome and reading lamp assembly and, particularly, to such an assembly in which a single source of light provides both a general purpose dome light and a concentrated beam of reading light for the passenger compartment of a vehicle.

It has been conventional practice to mount a dome light within the interior of vehicle passenger compartments to provide general purpose illumination for the vehicle occupants. However, the intensity of the light provided by the dome light source has been inadequate for the purpose of reading maps and the like. As a result and in order to provide illumination of greater intensity than that supplied by the dome light source, it has been necessary to install a separate reading light assembly within the passenger compartment. In such installations, the dome light supplies general purpose illumination while the reading light supplies a more intense beam of light for reading and other purposes.

It is a principal object and feature of this invention to provide a dome and reading lamp assembly in which a single source of light provides both general purpose illumination and a concentrated beam of reading light.

It is yet another object of this invention to provide such a combination dome and reading lamp assembly in which the reading lamp is freely adjustably mounted to enable an occupant of the vehicle to project the concentrated beam of reading light into any portion of the vehicle passenger compartment which he desires.

It is yet another object of this invention to provide such an assembly in combination with a vehicle of the type including a rear view mirror, and in which the dome light rays are prevented from projecting into the rear view mirror for reflection into the vehicle operator's eyes.

It is yet another object and feature of this invention to provide a combination dome and reading lamp assembly of the type aforementioned which is simple and inexpensive, readily manufactured and assembled and easy to maintain particularly with respect to replacement of the light source.

In general, these and other objects of this invention are obtained by providing a lamp body including, if desired, a reflector portion, and an annular groove forming a track. An annular mounting shell is suitably removably secured to the lamp body adjacent and enclosing the aforementioned track therein, and includes an annular bead or other suitable bearing means for adjustably frictionally receiving a translucent lens housing having a spherical main body portion seated and bearing on the annular bearing means of the mounting shell. The lens housing includes oppositely disposed follower members adapted to seat in and travel about the aforementioned annular track as the lens housing is rotated through 360°. However, in any given adjusted position of the housing, the follower members establish an axis of pivotal movement of the lens housing. A neck portion of the lens housing extends through the shell opening formed by the annular bead or bearing means of the shell, and receives a light-concentrating lens therein. The housing neck is so formed relative to the bearing means on the shell as to permit the housing to be pivoted within limits about the axis established by the aforementioned housing follower members. Preferably, and with respect to a passenger car, the aforementioned mounting shell member is entirely translucent except for that portion thereof presented toward the rear view mirror, which portion is opaque to prevent reflection of light from the rear view mirror into the vehicle operator's eyes. A single source of light is mounted within the lamp body so as to direct rays of general purpose light through the translucent portions of the mounting shell and lens housing, while directing other light rays through the reading lens to provide a concentrated beam.

These and other objects of this invention will appear more fully hereinafter as the description of the invention proceeds, and in which reference is made to the following drawings in which:

Figure 3 is an enlarged view taken on line 3—3 of Figure 1; and

Figure 4 is a sectional view taken on line 4—4 of Figure 2.

Figure 1:
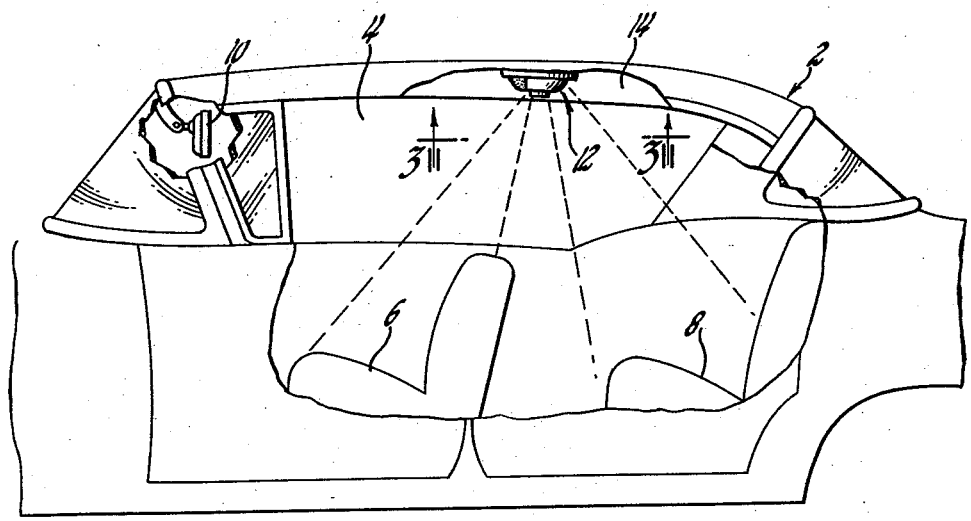
Figure 1 is a fragmentary side elevation, partly broken away to illustrate certain details of the invention, of a passenger car equipped with the invention.
Figure 2:
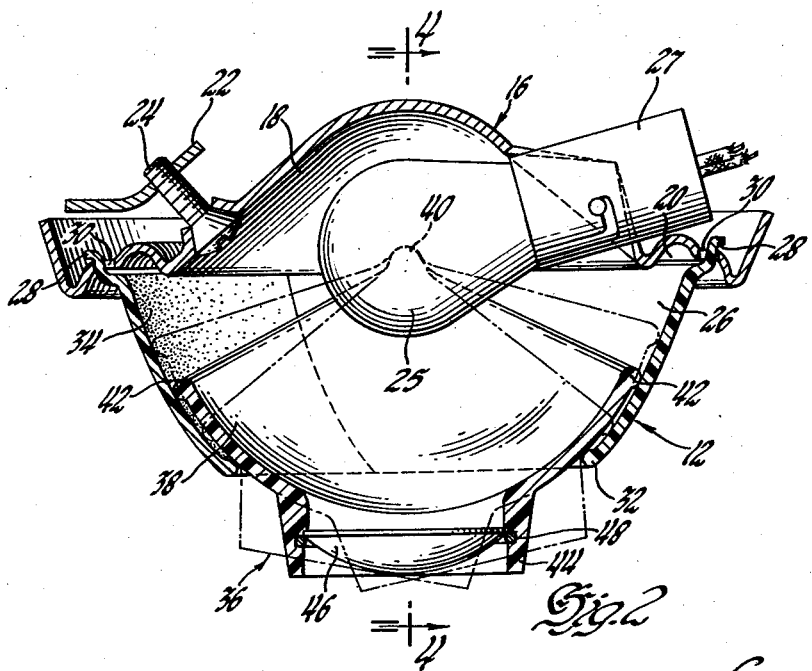
Figure 2 is an enlarged view of the dome and reading light assembly of Figure 1, and corresponds to a sectional view taken on line 2—2 of Figure 3.

For the purpose of disclosing a preferred embodiment of the invention by way of illustration, reference will be made to the use of the invention with a conventional passenger car although, as will be obvious hereinafter, the invention may just as readily be employed with other vehicles such as trains, buses and aircraft.

Referring now to the drawings, the numeral 2 indicates a conventional automotive vehicle having a passenger compartment 4 in which there are the usual seats such as the front and rear seats 6 and 8, respectively. The vehicle is equipped in the usual manner with a light reflecting rear view mirror 10 above or adjacent the front windshield. The dome and reading lamp assembly 12 is suitably secured as will appear hereinafter to the ceiling 14 of the passenger compartment.

The dome and reading lamp assembly includes a lamp body 16 having a generally cup-shaped reflector portion 18 which may be silvered, painted with a high luster aluminum paint or otherwise treated to provide a light redirecting reflector. An annular groove or track 20 is formed about the periphery of the reflector portion 18. The lamp body is adapted to be secured to a suitable structure in the roof of the vehicle, such as roof bow 22, as by a plurality of the fasteners 24. A single light source such as a conventional light bulb 25 is removably mounted in the socket 27 secured to the body 16, and directly in front of the reflector portion 18 of the body.

An annular mounting shell 26 includes a plurality of circumferentially spaced fingers 28 at the upper edge thereof adapted to snap through suitably formed slots 30 in the body 16 adjacent the annular groove 20. At its lower edge, the shell 26 is provided with an annular bearing rib or bead 32 defining an opening in the mounting shell opposite the reflector portion 18 of the lamp body. The mounting shell 26 is preferably formed of translucent "nylon" or other suitable translucent plastic material to form, in effect, a light transmitting window or lens. However, the forward section 34 of the mounting shell, which is presented toward the rear view mirror 10, is preferably painted or otherwise treated to make it opaque for a reason to appear more fully hereinafter.

A translucent lens housing 36, preferably made of a synthetic plastic material, includes a generally spherically shaped main body portion 38 adapted to bear and be universally adjustably supported on the annular bearing rib 32 of the mounting shell. In cross section, the lens housing is generally crescent shaped, and terminates in two oppositely disposed tips or follower members 40 which are seated in and follow about the annular groove or track 20. The edges of the lens housing between the follower members 40 include bearing ribs 42 engaging the interior surface of mounting shell 26. The generally cylindrical neck 44 of the lens housing projects through the opening in the shell 26, and is of such a diameter relative to this opening as to permit a limited degree of pivotal movement of the lens housing about an axis established by the follower members 40 on the lens housing. A suitable light-concentrating lens 46 is suitably fixedly secured, as by snap ring 48, within the neck of the lens housing.

From the foregoing description, it will be apparent that the single light source 25 will direct general purpose light rays through the translucent portion of the plastic mounting shell 26 and through the translucent lens housing 36 to provide a general purpose dome light. At the same time, rays of light from this same source will pass through the lens 46 to provide a concentrated beam of reading light. The direction of the beam of reading light may be adjusted at the will of a vehicle occupant by established for the lens housing 36. Thereafter, the lens 360° to position the follower points or members 40 of the housing in a selected position within the annular groove 20. In any given position of these follower points, a substantially horizontal axis of pivotal adjustment is estabilshed for the lens housing 36. Thereafter, the lens housing can be pivoted about such axis as limited by abutment of housing neck 44 with the annular mounting shell bearing rib 32 to project a concentrated beam of reading light into any desired position of the vehicle passenger compartment. Insofar as the general purpose light rays are concerned, the opaque portion 34 of the mounting shell 26 prevents any of these light rays from striking the rear view mirror 10 and being redirected into the eyes of the vehicle operator.

Having disclosed a preferred embodiment, it is to be understood that the invention is not to be limited thereby but only by the claims which follow.

I claim:

1. A dome and reading lamp assembly comprising a lamp body including an annular bearing surface defining a body opening, a translucent lens housing having a generally spherical surface universally adjustably mounted on said bearing surface and a portion extending through said body opening, a light-concentrating lens mounted in said housing portion, and a single light source disposed within said lamp body.

2. A dome and reading lamp assembly comprising a lamp body including an annular bearing surface defining a body opening, a translucent lens housing having a generally spherical bearing surface universally adjustably mounted on said bearing surface and a neck portion extending through said body opening in spaced relation to said bearing surface, a light-concentrating lens mounted in said neck portion, and a single light source disposed within said lamp body.

3. A dome and reading lamp assembly comprising a lamp body, a translucent mounting shell secured to said body and including an annular bearing means defining an opening in said shell, a translucent lens housing having a generally spherical bearing surface universally adjustably mounted on said bearing means within said mounting shell and including a neck portion extending through the opening in said shell, a light-concentrating lens mounted in said neck portion, and a single light source mounted within said assembly to direct light rays through said concentrating lens and through said translucent shell and lens housing.

4. A dome and reading lamp assembly comprising a lamp body, a translucent annular mounting shell secured to said body and having an annular bearing surface defining an opening, a translucent lens housing having a generally spherical surface universally adjustably mounted on said bearing surface and a neck portion extending through said opening in spaced relation to said bearing surface, a light-concentrating lens mounted in said neck portion, and a single light source disposed within said lamp body to transmit light rays therefrom through said shell and housing, and through said light-concentrating lens.

5. A dome and reading lamp assembly comprising a lamp body, an annular groove adjacent the periphery of said body forming a track, a mounting shell secured to said body radially outwardly of said track and having annular bearing means defining an opening in said shell, a lens housing having a generally spherical wall surface universally adjustably mounted in engagement with said bearing means and oppositely spaced structural portions seated within said track, said housing having a neck portion extending through the opening in said shell, a light-concentrating lens mounted within said neck portion, and a single light source mounted within said lamp body.

6. A dome and reading lamp assembly comprising a lamp body, an annular groove adjacent the periphery of said body forming a track, a mounting shell secured to said body radially outwardly of said track and having annular bearing means defining an opening in said shell, a translucent lens housing having a generally spherical wall surface universally adjustably mounted in engagement with said bearing means and oppositely spaced structural portions seated within said track, said housing having a neck portion extending through the opening in said shell, a light-concentrating lens mounted within said neck portion, and a single light source mounted within said lamp body to direct general purpose light rays through said translucent housing and reading light through said lens.

7. A dome and reading lamp assembly comprising a lamp body, an annular groove adjacent the periphery of said body forming a track, a translucent mounting shell secured to said body radially outwardly of said track and having annular bearing means defining an opening in said shell, a translucent lens housing having a generally spherical surface universally adjustably mounted in engagement with said bearing means and oppositely spaced structural portions seated within said track, said housing having a neck portion extending through the opening in said shell, a light-concentrating lens mounted within said neck portion, and a single light source mounted within said lamp body to direct general purpose light rays through said translucent shell and housing and reading light through said lens.

8. A dome and reading lamp assembly comprising a lamp body, said body including an annular peripheral groove forming a track, an annular mounting shell secured to said lamp body outwardly of said track and including annular being means defining an opening in said shell, a lens housing including a generally spherical body portion disposed within said shell in engagement with said bearing means and a neck portion extending through the opening in said shell, oppositely disposed follower portions of said housing being seated in said track for movement thereabout, said lens housing being rotatable through 360° as said follower portions travel about said track, said follower portions in any given position of rotation of said housing establishing an axis of pivotal movement of said housing, and a single light source mounted within said body.

9. A dome and reading lamp assembly comprising a lamp body, said body including an annular peripheral groove forming a track, an annular mounting shell secured to said lamp body outwardly of said track and including annular frictional bearing means defining an opening in said shell, a translucent lens housing including a generally spherical body portion disposed within said shell in engagement with said bearing means and a neck portion extending through the opening in said shell, oppositely disposed follower portions of said housing being seated in said track for movement thereabout, said lens housing being rotatable through 360° as said follower portions travel about said track, said follower portions in any given position of rotation of said housing establishing an axis of pivotal movement of said housing, and a single light source mounted within said body to direct general purpose light rays through said translucent housing and reading light through said lens.

10. A dome and reading lamp assembly comprising a lamp body, said body including an annular peripheral groove forming a track, an annular translucent mounting shell secured to said lamp body outwardly of said track and including annular bearing means defining an opening in said shell, a translucent lens housing including a generally spherical body portion disposed within said shell in engagement with said bearing means and a neck portion extending through the opening in said shell, oppositely disposed follower portions of said housing being seated in said track for movement thereabout, said lens housing being rotatable through 360° as said follower portions travel about said track, said follower portions in any given position of rotation of said housing establishing an axis of pivotal movement of said housing, and a single light source mounted within said body to direct general purpose light rays through said translucent shell and housing and reading light through said lens.

11. In combination with a vehicle passenger compartment having a rear view mirror, a dome and reading lamp assembly mounted within said compartment; said assembly comprising a lamp body including a mounting shell, said shell being translucent except for an opaque portion thereof presented toward said rear view mirror, a light-concentrating lens, means mounting said lens in said shell, and a single light source mounted within said body to direct general purpose light rays through the translucent portion of said shell and a concentrated beam of reading light through said lens.

References Cited in the file of this patent
UNITED STATES PATENTS

| | | |
|---|---|---|
| 1,844,624 | Young et al. | Feb. 9, 1932 |
| 2,152,197 | Levy | Mar. 28, 1939 |
| 2,285,002 | Wilson | June 2, 1942 |
| 2,602,135 | Nordquist | July 1, 1952 |
| 2,782,295 | Schwenkler | Feb. 19, 1957 |

UNITED STATES PATENT OFFICE
CERTIFICATION OF CORRECTION

Patent No. 2,957,073              October 18, 1960

George D. Legge

It is hereby certified that error appears in the above numbered patent requiring correction and that the said Letters Patent should read as corrected below.

Column 3, line 27, for "established for the lens housing 36. Thereafter, the lens" read -- rotating the lens housing 36 to any position throughout --.

Signed and sealed this 2nd day of May 1961.

(SEAL)

Attest:
ERNEST W. SWIDER
Attesting Officer

DAVID L. LADD
Commissioner of Patents